March 31, 1970  G. C. WILBURN ET AL  3,504,318
THREE-PHASE TRANSFORMER WITH FOUR LEGGED MAGNETIC CORE
Original Filed Nov. 30, 1967  2 Sheets-Sheet 1

WITNESSES
Theodore F. Wrobel
James F. Young

INVENTORS
Garlington C. Wilburn
and Gerald J. Hattrup
BY
Donald R. Lackey
ATTORNEY March 31, 1970  G. C. WILBURN ET AL  3,504,318
THREE-PHASE TRANSFORMER WITH FOUR LEGGED MAGNETIC CORE
Original Filed Nov. 30, 1967  2 Sheets-Sheet 2

United States Patent Office 3,504,318
Patented Mar. 31, 1970

3,504,318
THREE-PHASE TRANSFORMER WITH FOUR LEGGED MAGNETIC CORE
Garlington C. Wilburn and Gerald J. Hattrup, Sharpsville, Pa., assignors to Westinghouse Electric Corporation, Pittsburgh, Pa., a corporation of Pennsylvania
Continuation of application Ser. No. 686,988, Nov. 30, 1967. This application May 7, 1969, Ser. No. 824,376
Int. Cl. H01f 33/00, 27/24
U.S. Cl. 336—12
10 Claims

ABSTRACT OF THE DISCLOSURE

A three-phase transformer of the core-form type including wye-wye connected primary and secondary windings having grounded neutrals, and having a new and improved four-legged magnetic core. Three of the legs of the magnetic core are winding legs for receiving the primary and secondary phase windings of the three electrical phases, and the remaining leg, which is disposed between two of the winding legs, functions during unbalanced load conditions to provide a path for zero sequence fluxes.

---

This application is a continuation of application Ser. No. 686,988, filed Nov. 30, 1967, now abandoned.

BACKGROUND OF THE INVENTION

(1) Field of the invention

The invention relates in general to electrical apparatus, such as transformers, and more particularly to three-phase electrical transformers of the core-form type, and magnetic cores therefor.

(2) Description of the prior art

Three-phase electrical transformers of the core-form type for pad mounting, wherein the primary supply voltage is connected to the transformer via underground shielded cables, presents a circuit which may give rise to ferroresonance. For example, when the primary windings of the transformer are sequentially switched with single phase cutouts, which is the usual practice, a point is reached during the switching sequence where flux is flowing in the winding leg of an open circulated winding, due to one or both of the other phases being energized. The inductive reactance of the open circuited winding is effectively connected in series circuit relation with the ground capacitance of the shielded cable connected thereto, and the voltage induced into the open circuited winding due to the flux flowing therethrough from the energized phase, or phases, may give rise to overvoltages due to ferroresonance occurring in this series circuit.

The problem of ferroresonance may be obviated, or at least minimized within acceptable limits, by connecting both the primary and secondary windings of the transformer in wye, and by grounding their neutral points. The grounded neutral of the wye connection short circuits the resonant reactances, and minimizes the probability of ferroresonance.

The grounded wye-wye connection of the transformer, however, provides a path for zero sequence currents to flow during unbalanced load conditions, and during line-to-ground faults. Since the zero-sequence fluxes flowing in the three winding legs are in phase, some provision must be made to provide a return path for this flux, or it will be forced outside of the magnetic core and into the end frames of the core and into the tank walls, which may cause serious heating of these components.

Disposing conventional auxiliary or tertiary windings on each winding leg, and connecting them in a delta configuration, is not a satisfactory or economical solution in the usual pad-mount installation. The zero sequence impedance of this delta connected tertiary winding will usually be so low that the magnitude of the zero sequence current flowing upon the occurrence of a fault located between the primary windings of the transformer and the electrical generator or power source, may cause one or more of the transformer primary fuses to blow, instead of clearing the fault solely with the protective apparatus designed for this purpose at the source. Designing the tertiary winding to have the proper impedance would be costly and, therefore, an undesirable solution to the problem.

For these reasons, it is conventional to utilize a five-legged magnetic core structure with a three-phase core-form pad mounted transformer. The primary and secondary windings are each connected in wye and grounded. The three intermediate legs of the magnetic core are windings legs, and the two outer legs provide a return path for any zero sequence flux which flows in the winding legs of the core. The impedance of the two outer legs to the flow of the zero sequence flux is low enough to prevent it from leaving the core and establishing a return path through the core end frames and tank walls, but high enough to limit the magnitude of the zero sequence current and prevent the transformer fuses from blowing upon a line-to-ground fault located between the power source and the transformer primary winding.

While the five-legged core-form magnetic core solves the hereinbefore mentioned problems associated with pad mounted transformers having grounded wye-wye connected windings, it increases the length of the magnetic core. Further, five-legged magnetic core structures do not have windings disposed on the outer legs, and thus cannot take advantage of the improved welded end frame construction applicable to certain types of transformer core-form constructions, which is disclosed in copending application Ser. No. 604,968, filed Dec. 27, 1966, now U.S. Patent 3,374,453, which is assigned to the same assignee as the present application.

Accordingly, it would be desirable to provide a new and improved three-phase transformer of the core-form type which may be pad mounted and connected in a grounded wye-wye configuration, which has a shorter magnetic core than a five-legged magnetic core of the same rating, and which may be used with the welded end frame construction disclosed in the hereinbefore mentioned copending patent application.

SUMMARY OF THE INVENTION

Briefly, the present invention comprises a new and improved three-phase transformer of the core-form type having grounded wye-wye connected primary and secondary windings, and a new and improved magnetic core for use therein, which has four leg members. Three of the leg members of the magnetic core are winding legs, about which the three phases of the electrical windings are disposed, and the fourth or additional leg is disposed between two of the winding legs. The two outer legs, therefore, are winding legs, which allows the use of the new end frame construction disclosed in the hereinbefore mentioned copending application. The fourth or additional leg provides a return path for any zero sequence flux which may flow. It inherently has a high enough impedance to the zero sequence flux to prevent the transformer fuses from blowing upon a line-to-ground fault located between the primary windings of the transformer and the source of alternating potential, and it is low enough to limit the amount of zero sequence flux which leaves the magnetic core, preventing heating of the end frames and tank walls. Further, the length of the yoke sections of the magnetic core is reduced, compared with a similarly rated five-legged magnetic core, at least by the length of the window opening of a conventional three-legged magnetic core of similar rating, thus reducing the length of the yoke and reducing the weight and cost of the transformer.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
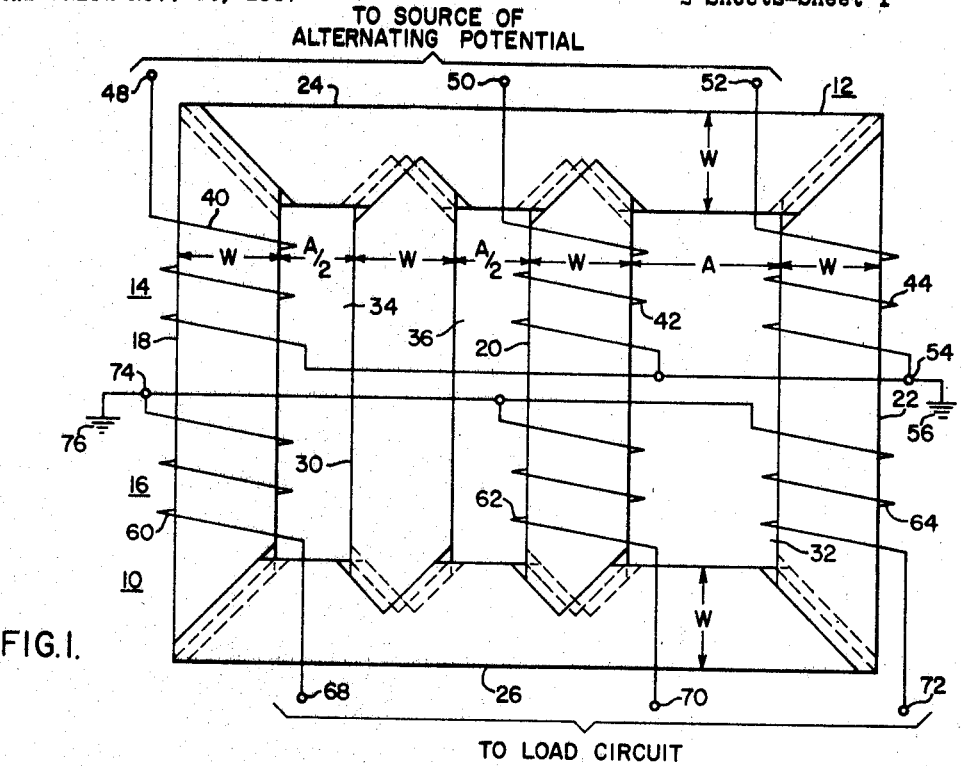
FIGURE 1 is an elevational view of a transformer constructed according to the teachings of the invention.

Referring now to the drawings, and FIG. 1 in particular, there is shown a three-phase transformer 10 constructed according to a first embodiment of the invention. Transformer 10 includes a new and improved magnetic core structure 12, shown in an elevational view, and primary and secondary windings 14 and 16, respectively, which are shown schematically. Transformer 10 is of the three-phase core-form type, with its primary and secondary windings 14 and 16 being connected in a grounded wye-wye configuration.

More specifically, magnetic core 12 includes first, second and third winding leg members 18, 20 and 22, disposed in spaced parallel relation, which have their ends joined by upper and lower yoke members 24 and 26. Leg members 18, 20 and 22 are each formed of a plurality of stacked metallic, magnetic laminations, such as silicon, cold rolled electrical steel, having at least one prefered direction of magnetic orientation. The ends of the laminations which make up the first and third, or outer leg members 18 and 22 have their ends cut diagonally, for example at an angle of 45° with respect to the longitudinal dimension of the lamination, and the ends of the laminations which make up the second or intermediate winding leg member 20 are cut to form "spear points," with two diagonal cuts at each end.

As will be explained more fully hereinafter, a fourth leg member 30 is disposed between two of the winding leg members, such as between winding leg members 18 and 20, as shown in FIG. 1. Unlike leg members 18, 20 and 22, leg member 30 is not a winding leg member. In the embodiment of the invention shown in FIG. 1, leg member 30 has its ends cut into spear points, and its ends connected to upper and lower yoke members 24 and 26, similar to the intermediate leg member 20.

The upper and lower yoke members 24 and 26 are constructed of a plurality of layers of metallic, magnetic laminations similar to the winding leg members 18, 20 and 22, with each layer having a single lamination as shown in FIG. 1 or each layer may be divided into two or more laminations, depending upon the length of the yoke members. The ends of each lamination of both the upper and lower yoke members are cut diagonally to match the diagonal cuts on the laminations of the outer leg members 18 and 22. Each layer of laminations of the upper and lower yoke members 24 and 26 also contains an appropriate notch or indentation which matches the spear points of the two intermediate leg members 20 and 30.

The joints formed in each layer of laminations between the various leg and yoke members may be offset from similar joints in succeeding layers in a predetermined stepped-lap pattern, as shown by the dotted lines in FIG. 1, and disclosed in U.S. Patent 3,153,215, issued Oct. 13, 1964, which is assigned to the same assignee as the present application, or any other suitable joint arrangement may be used, such as the butt-lap configuration.

Leg members 20 and 22, and the portions of the upper and lower yoke members 24 and 26 which join them, are dimensioned the same as they would be in a conventional three-legged magnetic core of the same rating, with the width of the leg members 20 and 22 being the same and given the dimension W, as shown in FIG. 1. The window 32 formed between these legs is given the width dimension A, which is suitable for receiving the windings on both winding legs 20 and 22. As shown in FIG. 1, magnetic core 12, in this embodiment of the invention, has yoke laminations which are the same width W as the winding leg laminations. However, yoke widening may be used when necessary to increase the yoke dimension between the outer sides of the yoke members and the ends of the spear points of the intermediate leg members 20 and 30.

The remainder of the magnetic core 12 from winding leg 20 to winding leg 18 is different than a conventional three-legged magnetic core, with this portion of the upper and lower yoke portions being lengthened by the dimension W, in order to accommodate the fourth leg member 30, and still provide a window 34 having a width dimension $A/2$ for receiving the windings on winding leg member 18, and a window 36 having a width dimension $A/2$ for receiving the windings on winding leg member 20. The fourth winding leg member is given the dimension W, as this will be its maximum dimension. It is possible that its width may be reduced somewhat, but since it will facilitate manufacturing to form the complete magnetic core structure 12 from a single lamination width, for practical purposes it will usually have the dimension W. Thus, the overall length of the magnetic core 12 shown in FIG. 1 is equal to $4W+2A$.

As hereinbefore stated, the primary and secondary windings 14 and 16 are connected in a grounded wye-wye configuration, with primary winding 14 including phase winding sections 40, 42 and 44 disposed about winding legs 18, 20 and 22, respectively. Phase winding sections 40, 42 and 44 have one end connected to terminals 48, 50 and 52, respectively, which are adapted for connection to a three-phase source of alternating potential, and the other ends of the phase winding sections are connected in common at neutral terminal 54, which is grounded at 56.

Secondary winding 16 includes phase winding sections 60, 62 and 64, which are disposed about winding leg members 18, 20 and 22, respectively. Phase winding sections 60, 62 and 64 have one end connected to terminals 68, 70 and 72, respectively, which are adapted for connection to a three-phase AC load circuit, and their other ends are connected in common at neutral terminal 74, which is grounded at 76.

While the primary and secondary phase winding sections on each winding leg are shown spaced apart, according to conventional core-form construction they will usually be disposed concentrically adjacent one another.

As hereinbefore stated, pad mounted power transformers connected into the electrical system via underground shielded cables, presents ferroresonance problems due to the capacitance of the shielded cable to ground. The incidence of ferroresonance is substantially reduced by connecting the windings in a grounded wye-wye configuration, as shown in FIG. 1. This connection of the windings, however, provides a path for zero sequence currents to flow during unbalanced load conditions and during short circuit conditions, and thus some provision may be made for the zero sequence flux. Shell-form magnetic core construction automatically provides return paths for the zero sequence flux in each winding leg, and this basic five-legged configuration of the shell form magnetic core has been carried over into the core-form construction, as shown in the five-legged core-form magnetic core 80 of the prior art in FIG. 1A. For purposes of comparison with the magnetic core 12 of FIG. 1, the prior art five-legged magnetic core 80 will be assumed to be the same rating as magnetic core 12, and dimensioned accordingly.

Magnetic core 80 has three intermediate winding leg members 82, 84 and 86, which receive the phase winding sections 88, 90 and 92, respectively, of the primary and secondary windings, which are indicated generally in dotted outline. Magetic core 80 also has two outer leg portions 94 and 96, and upper and lower yoke portions 98 and 100, respectively. The yoke portions 98 and 100 join the ends of the spaced parallel leg portions, forming windows 102, 104, 106 and 108. The winding leg members will have a width dimension equal to W, and windows 104 and 106 have a width dimension equal to A. The outer leg members 94 and 96 usually have a width dimension equal to one half of the winding leg width plus ½ inch, or $W/2+½$ inch, and windows 102 and 108 require a width dimension equal to $A/2$. Thus, the overall width or length dimension of the five-legged magnetic core structure 80 is equal to $4W+3A+1$ inch. Since the overall width of the four-legged magnetic core structure 12 shown in FIG. 1, which is constructed according to the teachings of the invention, is $4W+2A$, the upper and lower yoke members 98 and 100 of magnetic core 80 are each longer than the upper and lower yoke members 24 and 26 of magnetic core 12, by the dimension $A+1$ inch. Therefore, the magnetic core 12 is substantially narrower than the magnetic core 80. Further, the magnetic core 12 is easier to manufacture than magnetic core 80, as it may be constructed from laminations having the same width dimension W, while magnetic core 80 requires at least two lamination widths, W and $W/2+½$ inch.

The five-legged magnetic core 80 of the prior art has substantially higher losses and a higher sound level than the conventional three-legged magnetic core of the same rating, especially on transformers rated 1000 kva. and larger. The four-legged magnetic core structure 12, which minimizes the waveform distortion of the yoke fluxes, compared to the distortion in a five-legged core, produces losses and a noise level which more closely conform to those of similarly rated three-legged magnetic cores. Therefore, in order to obtain a five-legged core which has a sound level and losses comparable to a four-legged core constructed according to the teachings of the invention, the dimensions and cross sectional area of the five-legged core shown in FIG. 1A would have to be substantially increased.

Figure 1A:
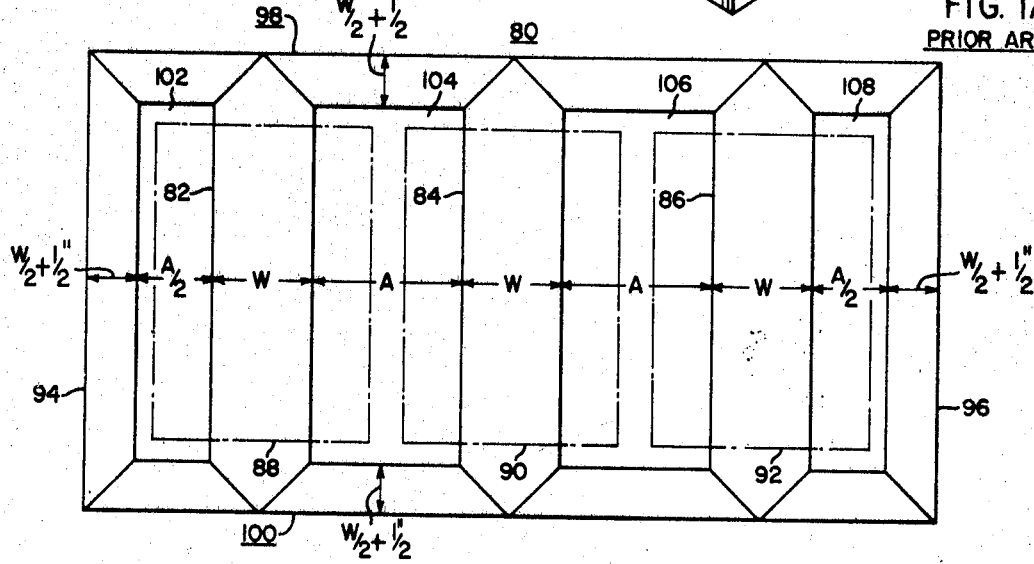
FIG. 1A is an elevational view of a transformer constructed according to the teachings of the prior art.

Another advantage of the four-legged magnetic core structure 12, shown in FIG. 1, over the prior art five-legged magnetic core structure shown in FIG. 1A, is the fact that its outer legs have windings disposed thereon. Thus, magnetic core 12 may utilize the benefits of the new end frame construction disclosed in the hereinbefore mentioned copending patent application, when the transformer is of the type which utilizes winding legs having a rectangular cross section and rectangular coils or winding sections. It should be noted, however, that the winding legs of magnetic core 12 may have a cruciform cross section, and utilize round coils or winding sections, with the type of winding and winding leg cross section depending upon the specific application.

Leg member 30 of magnetic core 12 provides a return path for zero sequence fluxes which flow in phase in the winding legs during an unbalanced load condition, providing a path which has a lower impedance to the zero sequence flux than the core end frames and the steel enclosure or tank, thus diverting the majority of the zero sequence flux from these elements, and preventing their heating. Further, the impedance of leg member 30 to the zero sequence fluxes is high enough to limit the magnitude of the zero sequence currents to a value which will not blow the primary fuses on the transformer during a line-to-ground fault located between the transformer primary windings and the source potential.

Since the only time that leg member 30 will carry magnetic flux is during extraordinary conditions, such as short circuits and unbalanced phase loadings, the magnetizing impedance of the leg is not critical. Thus, instead of employing the same high grade electrical steel for this leg member, lower cost steel may be used if desired, such as hot rolled steel.

Figure 2:
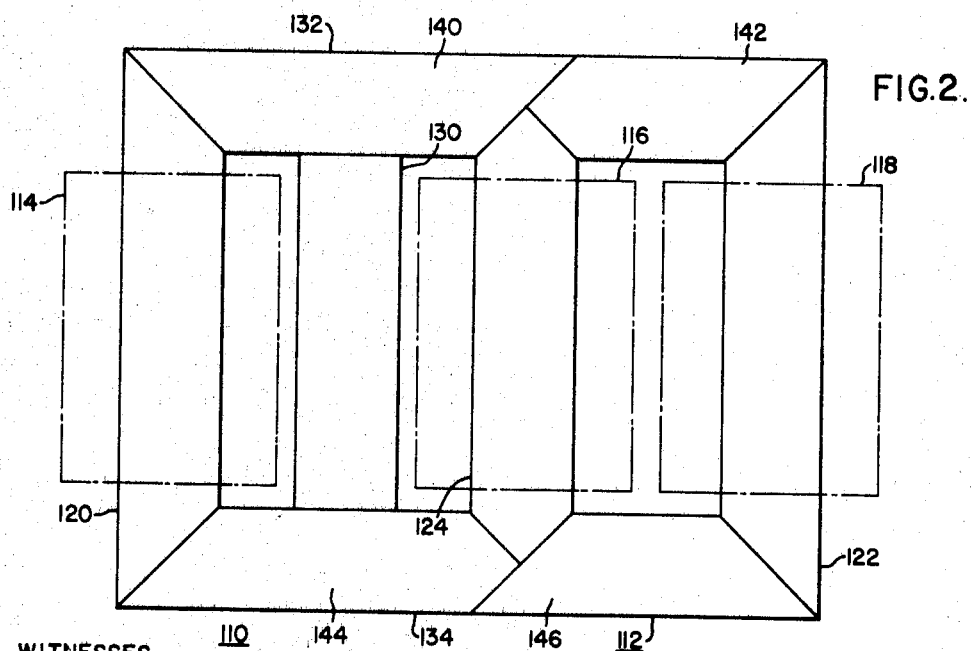
FIG. 2 is an elevational view of a transformer constructed according to another embodiment of the invention.
Figure 3:
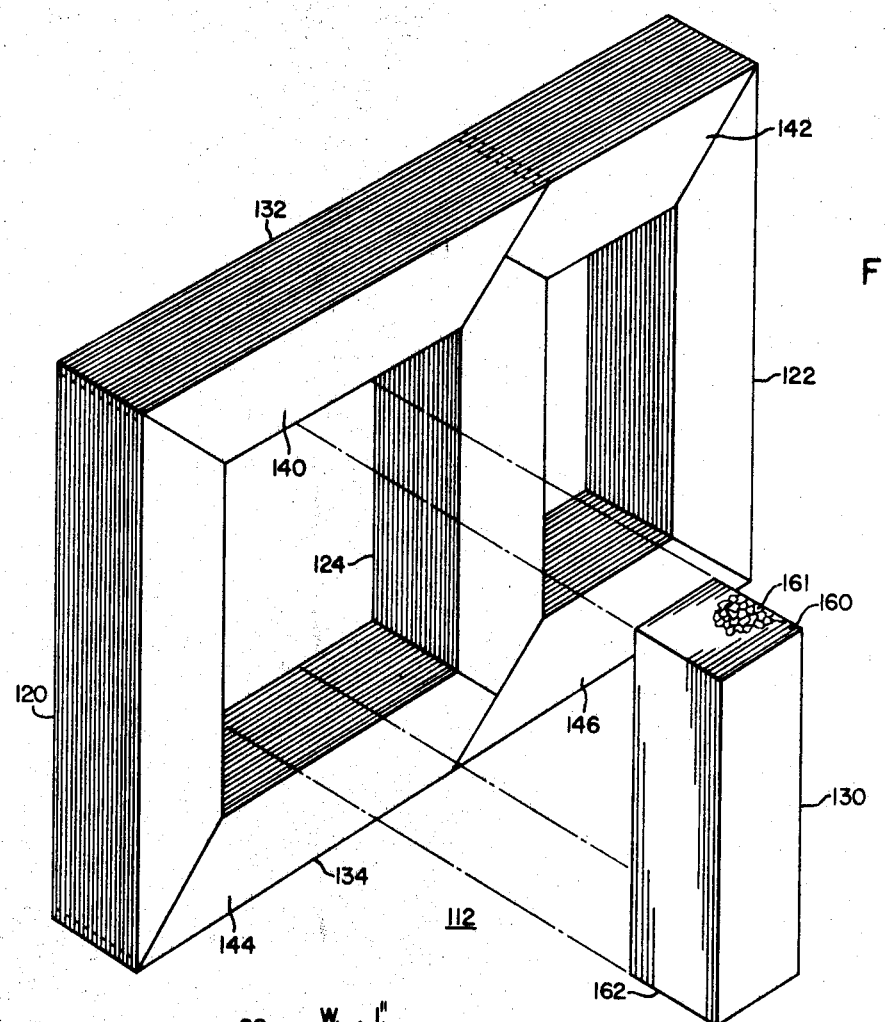
FIG. 3 is partially exploded, perspective view, of the magnetic core of the transformer shown in FIG. 2.

Since the magnetizing impedance of the additional leg member 30 is not critical, it is not essential that this leg be joined to the yoke portion with an interleaved type joint, such as shown in FIG. 1. FIGS. 2 and 3 illustrate an embodiment of the invention wherein the additional leg is joined to the yoke portions with a butt-type joint.

More specifically, FIG. 2 illustrates an elevational view of a three-phase transformer 110 of the core-form type, having a magnetic core 112 and phase winding sections 114, 116 and 118. FIG. 3 is a perspective view of the magnetic core 112 shown in FIG. 2. Magnetic core 112 includes outer winding leg members 120 and 122, an inner winding leg member 124, and an additional leg member 130 which is disposed between one of the outer and the inner winding legs, such as between winding legs 120 and 124. Upper and lower yoke members 132 and 134 connect the ends of the leg members 120, 122, 124 and 130. The magnetic core 112 shown in FIG. 2 may be constructed as hereinbefore explained relative to magnetic core 112 shown in FIG. 1, except the laminations of the upper and lower yoke members are not notched to receive the laminations of the leg member 130. Also, the laminations of the upper and lower yoke members 132 and 134 of magnetic core 112 are shown divided into two laminations per layer, such as laminations 140 and 142 in the upper yoke member, and laminations 144 and 146 in the lower yoke member. However, this is optional, and as hereinbefore stated will depend upon the specific application and the length of the yoke members.

The primary and secondary windings which make up the phase windings shown generally at 114, 116 and 118, are connected in a grounded wye-wye configuration, as hereinbefore described relative to FIG. 1.

Instead of building up the leg member 130 as the magnetic core 112 is constructed, and providing an interleaved type joint between the leg member 130 and the upper and lower yoke members 132 and 134, such as a stepped-lap joint, or a butt-lap joint, the ends of leg member 130 simply butt up against the inside surfaces of the upper and lower yoke members. This construction has several important advantages. For example, as shown in FIG. 3, leg portion 130 may be placed into position after the three-legged magnetic core structure is completely assembled. Since the only difference between the portion of the magnetic core 112 shown in FIG. 3 without leg 130 is a longer yoke dimension between winding legs 120 and 124, all of the laminations except laminations 140 and 144 will be the same as used for a conventional three-legged magnetic core structure of similar rating. Thus, the existing manufacturing facilities for three-legged cores may be used to make magnetic core 112, and it may utilize the same joint configuration as the conventional three-legged cores. Leg member 130 may be manufactured separately, and to facilitate its introduction between the yoke members, it may have its laminations bonded together, such as with an epoxy resin adhesive. Similarly, leg member 130 may be secured into its operating position in the magnetic core structure by disposing a suitable adhesive means 161, such as an epoxy resin adhesive, between the ends 160 and 162 of leg member 130 and the upper and lower yoke members 132 and 134, respectively. Since leg member 130 may be conveniently constructed in a separate operation, it may be made of any suitable low cost magnetic material, and its width may be dictated by the specific application, instead of being selected to be the same as the width of the winding leg members.

In summary, there has been disclosed a new and improved three-phase transformer of the core-form type having a new and improved magnetic core structure, and grounded wye-wye connected primary and secondary windings, suitable for pad mounting and connection to underground shielded cables. The fourth leg, disposed between any two of the winding legs, provides a path for zero sequence flux during unbalanced phase conditions, and requires only that a conventional three-phase core of similar rating be lengthened by the width of the additional leg member. This provides a substantial advantage over the prior art five-legged magnetic core structures usually used in such applications, as the four-legged magnetic core disclosed herein has a smaller width dimension than a comparable five-legged core, by at least the width of the window opening in a conventional three-legged magnetic core of similar rating. The four-legged magnetic core structure disclosed herein causes less waveform distortion of the yoke fluxes than a five-legged core, reducing its losses and sound level compared to the five-legged core. The four-legged magnetic core also facilitates manufacturing, compared with the five-legged magnetic core, as all of the laminations may be of same width, and, if desired, the core may be initially constructed as a three-legged magnetic core by lengthening the yoke members between two of the legs, and the additional leg may be inserted after the initial assembly of the three-legged structure is completed. Also, since the outer legs are winding legs similar to a conventional three-legged magnetic core structure, the core parts which are assembled to provide the core end frames and provide coil bracing for three-legged core structures, may be readily adapted for use with the disclosed four-legged structure.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. A three-phase transformer comprising:
   a magnetic core having only first, second, third and fourth leg members,
   said fourth leg member being disposed between two of the other leg members,
   first and second yoke members disposed to connect the ends of said first, second, third and fourth leg members,
   first, second and third phase winding assemblies disposed in inductive relation with the first, second and third leg members, respectively, with said fourth leg member being free of windings, said first, second and third phase winding assemblies including primary and secondary windings connected in a grounded wye-wye configuration.

2. The three phase transformer of claim 1 wherein said fourth leg member is connected to the first and second yoke member with an interleaved type joint.

3. The three-phase transformer of claim 1 wherein said fourth leg member is connected to the first and second yoke members with a butt-type joint.

4. The three-phase transformer of claim 3 including adhesive means disposed in the butt-type joints between said fourth leg member and said first and second yoke members.

5. The three-phase transformer of of claim 1 wherein said fourth leg member is disposed between said first and second winding leg members, providing a distance of $A/2$ between said fourth leg member and each of said first and second winding leg members, and wherein the distance between said second and third winding leg members is equal to A.

6. The three-phase transformer of claim 5 wherein said first, second and third winding leg members and said fourth leg member have substantially the same width dimension.

7. A three-phase magnetic core structure suitable for use with grounded wye-wye connected primary and secondary windings, comprising:
   first, second and third winding leg members disposed in successive, spaced, parallel relation,
   said first and second winding leg members being disposed a distance of $A+W$ apart, and said second and third winding leg members being disposed a distance of A apart,
   a fourth leg member,
   said first, second and third winding leg members and said fourth leg member having a width equal to W,
   said fourth leg member being disposed between said first and second leg members to provide a distance of $A/2$ between said fourth leg member and said first winding leg member, and a distance of $A/2$ between said fourth leg member and said second winding leg member,
   and first and second yoke members disposed to connect the ends of said first, second and third winding leg members, and said fourth leg member.

8. The three-phase magnetic core structure of claim 7 wherein said fourth leg member is connected to the first and second yoke members with an interleaved type joint.

9. The three-phase magnetic core structure of claim 7 wherein said fourth leg member is connected to the first and second yoke members with a butt-type joint.

10. The three-phase magnetic core structure of claim 9 including adhesive means disposed in the butt-type joints between said fourth leg member and said first and second yoke members.

References Cited

UNITED STATES PATENTS

| | | | |
|---|---|---|---|
| 2,318,095 | 5/1943 | Putman | 336—219 XR |
| 2,991,437 | 7/1961 | Kreuzer et al. | 336—5 |
| 3,295,084 | 12/1966 | Horstmen | 336—216 XR |
| 3,395,373 | 7/1968 | Stephene | 336—215 |

FOREIGN PATENTS

| | | |
|---|---|---|
| 436,839 | 4/1912 | France. |

THOMAS J. KOZMA, Primary Examiner

U.S. Cl. X.R.
336—215, 217, 219